Patented Feb. 23, 1937

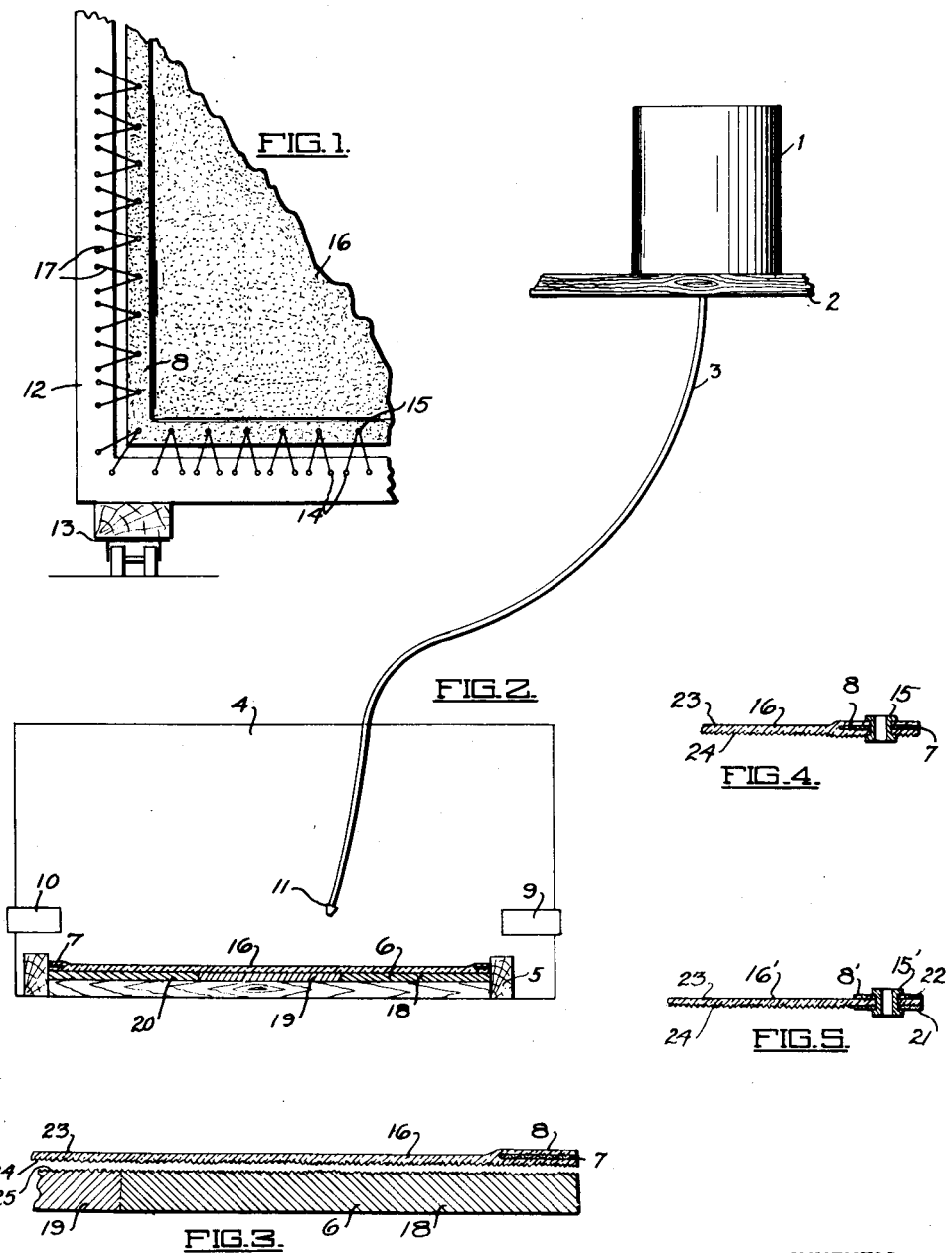

2,071,342

UNITED STATES PATENT OFFICE 2,071,342

TRANSLUCENT PROJECTION SCREEN

Fred W. Jackman, Beverly Hills, Calif., assignor to Warner Bros. Pictures, Inc., New York, N. Y., a corporation of Delaware Application June 17, 1935, Serial No. 27,017

6 Claims. (Cl. 88—24)

This invention relates to a translucent motion picture screen, more particularly to a screen which is flexible, and light in weight.

It has heretofore been proposed to employ a glass screen having a ground surface, on which a picture or motion pictures are projected, in order that such pictures may be viewed or photographed from the opposite side of the screen. A glass screen has several disadvantages, in that it is expensive, heavy and dangerous to move (due to possible injury to workmen).

One object of the present invention is to avoid the expense, inconvenience, and danger of a fragile translucent screen such as a ground glass screen.

I have discovered that cellulose acetate is suitable material for making a translucent screen which is flexible and light in weight. Heretofore, cellulose acetate, and the nitrate as well, have been offered for sale in sheet form. In the form in which it is available on the market, it has not been satisfactory as a translucent screen because in the first place the largest sheet which could be purchased was only 20" x 50" and furthermore, this sheet was either transparent instead of being translucent, or it contained a pigment which rendered it opaque.

In making a projected type of shot, wherein action is photographed by a motion picture camera in front of a translucent screen behind which is arranged a motion picture projector, it is desirable that the screen should be quite large, for example 20' x 40', although much smaller screens are useful in certain cases.

An object of the present invention is to employ cellulose acetate for constructing a screen which is translucent, and of any desired size, small or large, and in particular, much larger than the sheets of transparent cellulose acetate heretofore available.

According to the invention, the screen is made of any desired size, large or small, by dissolving in a solvent either the transparent cellulose acetate in sheet form referred to above, or acetated cotton which is fibrous and opaque in form, which becomes transparent in solution, and by spraying a multiple coating of this transparent solution onto a base or matrix from which the solidified screen is stripped. As the base or matrix can readily be made of any desired size, large or small, a sheet of cellulose material of any desired size can be produced. I consider this process of making a sheet of cellulose material to be an important part of my invention, regardless of whether the sheet is in the course of manufacture as hereafter described, or later treated to render it translucent. I prefer to make the sheet translucent and accomplish this in the course of manufacturing the sheet by spraying the solution as above described, onto a sand blasted matrix whereby the sheet when stripped from the matrix will carry on one surface thereof a copy of the minute irregular light refracting surfaces originally produced by sand blasting the matrix. In the course of manufacturing this screen as above described, the acetate solution is transparent, special precautions hereafter described being taken to keep it transparent during the spraying and solidifying or drying processes so that the body of the screen is transparent. In making a translucent screen, however, the outer surface of this transparent body of cellulose material is treated to render it translucent.

A further object of the invention is to prevent the production of air bubbles or opacity in the sheet or screen. The prevention of air bubbles is accomplished by spraying the solution in a thin layer on the matrix, instead of flowing it on, and also by supplying the cellulose acetate solution to the spray gun under gravitational pressure free from air pressure. Opacity is prevented by recognizing that the presence of moisture will convert the transparent solution to the opaque or cotton form of cellulose. In fact, water is one of the hardening agents which has been used heretofore in manufacturing lace or other cotton goods from cellulose solution. In the first place, I prevent moisture from rendering the screen opaque by performing the spraying operation in dry conditioned air. The use of no air pressure for the spray nozzle also contributes to this, the solution being atomized solely by hydrostatic pressure. Furthermore, due to the fact that rapid evaporation of the solvent from a coat which is drying would cause the moisture in the air to condense and form upon the surface of the cellulose sheet, I preferably add a retarding agent to the solution. For example, I may add a liquid known in the trade as "Methyl Cellosolve" which is ethylene glycol mono methyl ether and which retards the evaporation of the solvent, such as C. P. acetone, and consequently reduces the tendency for condensation of the moisture in the conditioned substantially dry air.

Another object of the invention is to provide a border strip to facilitate mounting the screen. This is accomplished by integrally uniting a border with the screen by means of cellulose material. Preferably, this is accomplished by placing a border on the matrix, before or after some of the coats have been sprayed thereon, the remaining coats being sprayed to cover this border whereby it is integrally united with the screen.

The present application is a continuation in part of my application Serial No. 631,964, filed September 7, 1932, for "Translucent picture projection screen." The present application claims the screen itself, and the process of making the screen is covered in my prior application referred to above and in application Serial No. 27,018, filed June 17, 1935, for Manufacture of cellulose sheets.

For further details of this invention reference may be made to the drawing, wherein:

Fig. 1 is a fragmentary side elevation of a screen mounted in a supporting frame.

Fig. 2 is a side elevation partly in cross section of a preferred arrangement of parts, used to prepare a screen according to this invention.

Fig. 3 is an enlarged fragmentary section of the base and resulting screen.

Fig. 4 is an enlarged fragmentary section of the screen showing an eyelet attached to the border thereof for suspending the screen within a suitable frame.

Fig. 5 is an enlarged fragmentary section of a modified arrangement for reinforcing the border of the screen.

The solution for making the screen comprises acetated cotton or cellulose acetate which I dissolve in C. P. acetone, plus such additives as are necessary to produce a flexible, transparent and tough film. A preferred mixture comprises the following:

10# acetated cotton
25 gal. chemically pure acetone
4 gal. ethylene glycol mono methyl ether
1 gal. ethylene glycol mono ethyl ether monoacetate
1# di-ethyl-phthalate The "Methyl Cellosolve" and "Cellosolve Acetate" which is ethylene glycol mono ethyl ether monoacetate are added to retard evaporation of the acetone and prevent the solution from evaporating so rapidly that it would cool the dry air to the dew point whereby moisture from the dry air is prevented from condensing on the sprayed surface. Also, by retarding evaporation of the solvent, the "Methyl Cellosolve" and "Cellosolve Acetate" retain the sprayed material in a fluid condition for a longer time than would otherwise be the case, whereby the sprayed material more readily flows into the crevices of the surface 25 and also this results in forming a substantially smooth outer surface 23 which has an unobjectionable small amount of orange-peel texture. The di-ethyl-phthalate serves as a plasticizer and any other suitable plasticizer may be used instead. An alternative cellulose mixture may include:

4.2 grams of cellulose acetate sheets cut up into small sheets or powdered
100 c. c. chemically pure acetone
20 c. c. of 80 to 90% glacial acetic acid The above ingredients are encased in a drum which is rotated for the length of time necessary to insure a complete solution of the cellulose acetate. The drum 1 (Fig. 2) containing the transparent cellulose acetate solution is then hoisted to a height where its gravitational pressure is approximately 15 lbs. per square inch at ground level. Drum 1 is supported by any suitable means, such as a beam 2. A tube 3 which is preferably of pure gum rubber, in order that the cellulose acetate solution will not chemically react with it during its passage there-through, is attached to the drum 1. The tube 3 passes through a wall 4 in a room, the floor of which is covered by a suitable frame 5 encasing a desired stationary base or matrix 6 which may be glass or preferably of metal such as aluminum having its upper surface sandblasted with a medium fine grain sand as shown at 25. When large sheets of cellulose material are to be made, the base 6 may be comprised of sections as at 18, 19 and 20 of metal welded together and finished to provide a large unbroken surface. An inlet valve 9 serves to supply especially dry conditioned air to the chamber and an outlet valve 10 exhausts the air and insures a continuous flow of dry conditioned air across the surface of the base 6.

In the operation of this device, a nozzle or spray gun 11 at the end of the tube 3 is opened and a thin coating of cellulose acetate solution is sprayed onto the base 6. This coating is allowed to dry thoroughly for example, 30 to 40 minutes, in the conditioned air which flows through the chamber. When this is accomplished, a second coating is applied and the same procedure followed. After about half of the desired coatings are applied, border strips as at 7 are secured upon the surface of the last coating. These strips 7 are preferably of fabric which is impregnated with a cellulose acetate solution and applied to the sheet 16 while the cellulose material is still tacky. The additional coatings are then sprayed on over both the former coatings and the border strips to provide a secure bond therebetween as shown in Fig. 3. Twenty to thirty coats of the solution are applied, each being allowed to dry separately until a desired thickness is obtained. The sheet of cellulose acetate is bodily stripped off the base 6 and comprises a sheet 16 shown in Figs. 1, 3 and 4 and at 16' in Fig. 5. This sheet 16 is flexible and light in weight and has a body portion which is substantially transparent with one surface 24 having a copy of the minute irregular light refracting projections on the surface 25 of the matrix 6. The sheet 16 is translucent due to the refraction or dispersion of light by the surface 24. Eyelets 15 are then secured within the border 8 of the sheet 16 (Fig. 4) whereby the sheet may be mounted within a suitable frame 12 (Fig. 1). These sheets or screens may be of considerable size, such as from ten to twenty feet along each edge.

Fig. 5 shows a modified arrangement for applying a reinforcing border upon the edge of the sheet 16'. In this case, a border strip 21 is first laid around the edges of the base 6 and the cellulose solution is sprayed on so as to cover and provide a bond between itself and the border strip 21. A second border strip 22 may then be secured to the opposite face of the resulting sheet 16'. Eyelets 15' are then passed through the assembly and then secured thereto. The border 8 may also be made up by combining the forms shown in Figs. 4 and 5.

The frame 12 is supported for mobility by means of any suitable rollers 13. A series of pins 14 are then placed along the edges of the frame 12 and are resiliently connected by means of springs or rubber bands 17 to a series of eyelets 15 in the border 8 along the edges of the screen 16. By using this form of mounting the screen will always remain taut without any wrinkles therein. This form of mounting is disclosed and claimed in my U. S. Patent No. 1,960,632, patented May 29, 1934.

Thus it will be seen that a screen is provided which is flexible, light in weight, inexpensive to make and readily rolled into a compact form for storage or transportaiton. A further advantage of this type of translucent screen is that, due to the thinness of the cellulose sheet (i. e. .020" to .030") very little light is lost in transmission, whereas in a glass screen the thickness must necessarily be large, usually on the order of ¼" to ⅜" to prevent breakage. It has been found by photometer readings that, other factors being equal, the intensity of illumination of a screen made by this process, and on which a motion picture is projected from behind the screen, is approximately 100% greater than the illumination of a treated glass screen. Therefore, a projector lamp of less intensity may be used thereby greatly reducing the amount of heat that is emitted from the projector onto the film or slide to be projected. Due to its acetate base, a screen of cellulose material formed by this process is practically non-inflammable and the risk of fire is reduced to a minimum.

In setting the translucent screen 16 between the projector and the camera or audience the smooth surface 23 is placed so that it faces the projector thus preventing any stray light which might fall upon the screen from being reflected into the camera audience.

Having thus described the invention, what is claimed as new and desired to secure by Letters Patent, is:

1. A translucent projection screen comprising a plurality of layers integrally united to form a sheet of cellulose material, and a reinforcing border interposed between certain layers around the edge of said sheet and integrally united within said sheet.

2. In a translucent picture projection screen, a plurality of layers integrally united to a form a sheet of cellulose material, a reinforcing border therefor interposed among said layers, and means comprising cellulose material for integrally uniting said reinforcing border within the edge of said sheet.

3. A projection screen comprising a plurality of layers integrally united to form a sheet of cellulose material having a translucent surface thereon, a flexible reinforcing border strip interposed between certain of said layers, and means comprising cellulose material for integrally uniting said reinforcing strip to said sheet.

4. A translucent projection screen comprising a plurality of layers integrally united to a form a sheet of cellulose material, a flexible border strip provided between certain layers of said sheet of cellulose material and integrally united therewith.

5. A projection screen comprising a plurality of layers integrally united to form a sheet of cellulose material having a translucent surface thereon, a flexible reinforcing border strip, and means comprising cellulose material for uniting said reinforcing strip to said sheet, said border strip being embedded in said cellulose material between certain layers of said sheet along the edge of said sheet.

6. A projection screen in accordance with claim 5 in which said border strip is provided with eyelets.

FRED W. JACKMAN.